United States Patent

[11] 3,575,587

| [72] | Inventor | Harry W. Mergler<br>Middleburg Heights, Ohio |
|---|---|---|
| [21] | Appl. No. | 525,505 |
| [22] | Filed | Feb. 7, 1966 |
| [45] | Patented | Apr. 20, 1971 |
| [73] | Assignee | Sybron Corporation<br>Rochester, N.Y. |

[54] DIGITAL PROPORTIONAL PLUS RESET PROCESS CONTROLLER
14 Claims, 2 Drawing Figs.

[52] U.S. Cl. .................................................. 235/151.1
[51] Int. Cl. .................................................. G05b 6/00
[50] Field of Search ....................................... 235/151.1,
151.12; 137/90; 235/167; 318/20.390, 20.550,
20.600, 20.610, 31

[56] References Cited
UNITED STATES PATENTS
3,201,572  8/1965  Yetter ......................... 235/151

3,247,365  4/1966  Dell et al. ..................... 235/164
3,311,909  3/1967  Glover .......................... 340/345
3,347,960  10/1967  Fenley ......................... 264/40

OTHER REFERENCES
" A Single-Loop, Two-Mode, Digital Process Controller"
IEEE International Convention Record Part 3, March 1965,
TK 6541 I55

Primary Examiner—Eugene G. Botz
Attorneys—Peter J. Young, Jr. and Joseph C. MacKenzie ABSTRACT: A direct digital process controller suitable for control of a single loop. The control algorithm characterizing the controller's action corresponds to the conventional analog proportional plus reset case. However, what corresponds to the proportional effect is exercised by the controller at a greater frequency than what corresponds to the reset effect.

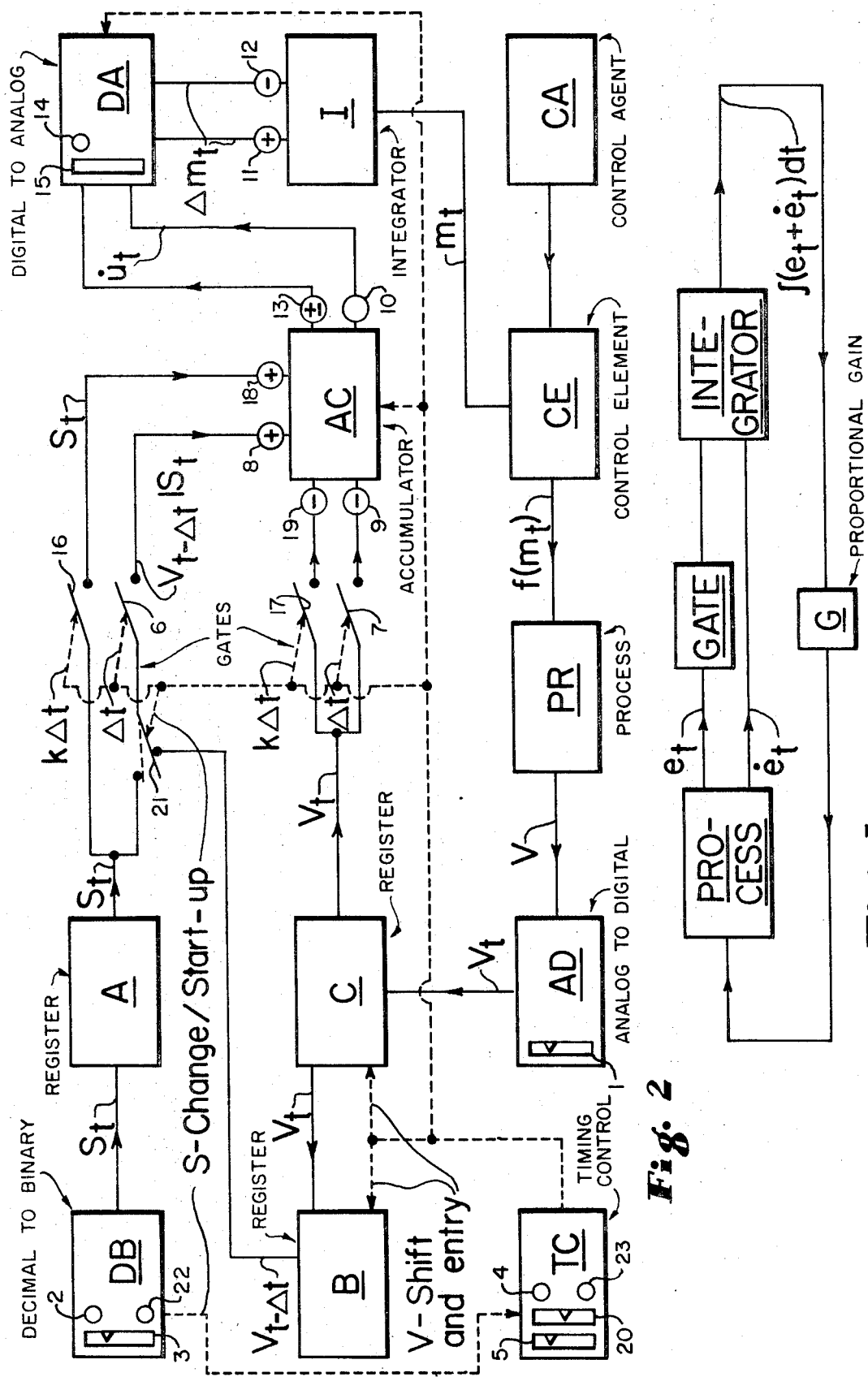

DIGITAL PROPORTIONAL PLUS RESET PROCESS CONTROLLER

This invention relates to process control, and in particular to process controllers of the type providing proportional plus reset control action.

By way of background, it is to be noted that control of a process, in general, involves the exchange of matter and/or energy with the process in such a way as to minimize deviation of the process from some predetermined state. Conversely, such process exchanges matter and/or energy with its environment in consequence of fulfilling its purposes, and of attempts to control it.

Thus, a tank of water is to be kept at a given temperature, but the temperature of the water is subject to various disturbances such as addition of water at a different temperature, exchange of heat between tank and environment, and so on. It may therefore be attempted to provide a compensatory heat exchange at a rate that varies in time in such manner as to nullify the effect of such disturbances. Ideally, the compensation would be such that at any instant the net temperature change due to disturbances and to compensatory heat exchange is zero. In practice, this ideal is only approximated, of course.

One problem typical of this process and of many others of quite different physical makeup is that the effect of disturbances, and of compensatory control requires a certain amount of time to be fully felt, and moreover, the rate at which the control effect can be supplied (i.e., in the example, rate of heat exchanging for control purposes) is limited. A common solution to this problem is to provide proportional plus reset control, whereby the rate at which control effect is supplied is caused to be in accordance with the following equation:

$$m_t = G(e_t + \frac{1}{T} \int e_t dt) \quad (1)$$

In terms of the example (supposing the water is being heated), $m_t$ = rate at which heat is being supplied to the process;

$e_t$ = difference between the actual temperature and the temperature at which it is desired to maintain the water;

$G$ = a constant (the so-called proportional gain setting of a controller creating $m_t$);

$T$ = a constant (the so-called reset time, which characterizes the time response of the process to heat exchange).

The subscript $t$ indicates that $m$ and $e$ are taken at a particular time $t$. The actual temperature is presumed to be the average temperature of the tank, although it is commonly measured at but one point in the process (i.e., the water in the tank).

Supposing the water is being heated by, say, steam flowing through heating coils in the tank, then $m_t$ represents rate of flow of steam into the coils. Since this rate is normally controlled by a valve having a part such as a stem or plug whose position may be taken to be a linear measure of rate of flow, then in terms of the example, equation (1) describes the desired position of the valve stem at any time $t$.

Equation (1), on its face, prescribes that it be implemented on a continuous basis, by measurement of process deviation (the difference between actual temperature and desired temperature), integration of the deviation, weighting the integral of the deviation by $1/T$, summing of the deviation and the weighted integral, and weighting of the sum by $G$. While this regime of measurement and computation can of course be utilized by a human operative to enable him to vary $m$ by hand, ordinarily, the process is incorporated in a system, wherein, in general, measurement, computation and movement of the valve is done automatically, namely, by a controller producing an output $u$ which the valve translates into $m$.

The present invention provides, in effect, for control in accordance with equation (1), but actually utilizes a novel computational regime that is simpler than that prescribed by equation (1), and is peculiarly suited to realization in digital form.

Accordingly, the general object of the invention is to provide a novel and improved form of proportional plus reset controller.

A more specific object of the invention is to provide a proportional plus reset controller having a new and improved manner of providing the reset component of its control action.

Another specific object of the invention is to provide a new and improved form of digital controller of the type providing proportional plus reset action.

It is also a specific object of the invention to provide a proportional plus reset controller having a new and improved manner of providing for process set point change and process start-up.

Again, it is a specific object of the invention to provide a new and improved proportional plus reset controller which is peculiarly suited to being realized in digital form but with such economy of parts, size, and cost that a controller according to the invention is practically useful as a single loop controller, and substantially as a replacement for a prior art, analog-type single loop, proportional plus reset controller.

Other objects of the invention will be evident from the disclosure and claims hereinbelow.

Briefly described, a proportional plus reset controller according to the invention, in effect, provides proportional action continually, and reset action intermittently. In a preferred embodiment, the controller samples the process variable at a given rate and makes proportional action changes at that rate. At a lesser rate, the controller samples a suitable measure of reset action and provides reset action changes at that rate. The several rates are so related that the total amount of reset action over a sufficiently long time interval is substantially the same as that amount would have been, had the controller exerted reset action more or less continuously.

In the preferred embodiment, the controller, in effect, senses the rate of change of the variation from a desired variable or set point of a process variable, and integrates this rate of change to provide information as to the proportional action necessary. The controller also senses the said variation and integrates this, too, to provide information as to the necessary reset action. Both types of information are combined and the result is integrated to provide a measure of the needed net control action. However, as a rule, the amount of reset action relative to the amount of proportional action varies from process to process, and therefore the controller combines the reset information with the proportional information only at the appropriate intervals.

In the drawings:

FIG. 1 is an elementary diagram illustrating the principles of the present invention; and FIG. 2 is a box diagram providing a constructional guide for realizing the preferred embodiment of the invention.

Turning to FIG. 1, the box marked PROCESS represents an entity which is a source of information as to the condition of a process variable, namely, $e_t$, the difference at time $t$ between the process variable and some desired value thereof, and $\dot{e}_t$, the time rate of change of $e_t$ at time $t$. The box labeled INTEGRATOR represents means for integrating the sum of the values of $e_t$ and $\dot{e}_t$ to ultimately produce the control action $m_t$ which is fed back to PROCESS. It is to be understood, of course, that $m_t$ will have a sense such as to tend to reduce $e_t$ to zero.

The box marked GATE represents means for interrupting the flow of information $e_t$ to INTEGRATOR, at a frequency and for intervals of time, such that the net $e_t$ information received by integrator just suffices to provide the reset action required by the process. In effect, GATE introduces into the system the factor $1/T$ of equation (1).

The box marked $G$ represents a means for introducing the proportional gain factor $G$ of equation (1) into the control loop, and at a place where it applies to the reset and proportional components of the control action equally.

The above-described operation of the system shown in FIG. 1 corresponds with that implied by equation (1). However, the effect of providing GATE and of using $\dot{e}_t$, is to avoid the computational problems indicated by equation (1). In other words, the controller according to the invention simplifies matters by what amounts to eliminating $1/T$ from the parentheses of equation (1), because instead of computing $1/T \int e_t \, dt$ continuously, the controller according to the invention computes $Ge_t$ only, for just enough time that had $1/T \int e_t \, dt$ been computed during that time, the integrated total would have a weighting factor of unity instead of $1/T$. When this point has been reached, the controller computes $\int e_t \, dt$, adds it to $e_t$, and multiplies the sum by $G$. The controller then reverts to computing $Ge_t$ only, until such time as computation of another unity-weighted integral component is in order, and so on.

The controller according to the invention further simplifies matters by removing the integral from the parentheses, in effect. This is done by computing, not $u_t$, but $\dot{u}_t$, the time derivative of $u_t$. Then $\dot{u}_t$, corresponding to $\dot{m}_t$, is integrated to provide $u_t$, which subsequently is converted to control effect $m_t$. The symbol $u$, of course, refers to what the controller computes, whereas $m$, in essence, refers to what computes, whereas $m$, in essence, refers to what the final control element does to the process in response to what the controller computes.

Finally, a controller according to the invention reduces the problem of implementing equation (1) to a regime of mere additions and subtractions. Specifically, if $V_t$ is the value of the temperature at a time $t$, $V_{t-\Delta t}$ is the value thereof at a time $\Delta t$, prior to $t$, and $S_t$ is the desired temperature at time $t$, and at time $t-\Delta t$, then a preferred form of controller according to the invention implements the following equation:

$$\dot{u}_t = \frac{G}{\Delta t}\left[-V_t + V_{t-\Delta t} + \frac{\Delta t}{T}(S_t - V_t)\right] \quad (2)$$

Equation (2) may be derived from equation (1) by taking the latter as an expression of controller output $u_t$ (instead of $m_t$), converting its right-hand side to discrete form and forming expressions for $u_t$ and $u_{t-\Delta t}$ therefrom, and then subtracting the latter from the former and dividing by $\Delta t$, whereby $\dot{u}_t$, the time derivative of $u_t$ results.

In any given case, $\Delta t$ and $T$ are given, and $\Delta t/T \leq 1$, usually less. According to the invention, the actual regime of computation is caused to be as follows:

$$\dot{u}_t = \frac{G}{\Delta t}(-V_t + V_{t-\Delta t}) \quad (3)$$

or, $$\dot{u}_t = \frac{G}{\Delta t}(-V_t + V_{t-\Delta t} + S_t - V_t) \quad (4)$$

Starting at time $t_o$, the controller is constructed to sample the value of $V_t$ at the beginning of each time interval $\Delta t$, thus, at $t_o$, $t_o + \Delta t$, $t_o + 2\Delta t$, and so on, $V_{t_0}, V_{t_0} + \Delta t, \ldots$, and, so on, are successively sampled. In short, in terms of equation (1), the controller samples $\Delta e_t$ at intervals $\Delta t$.

However, on beginning each $k$'th interval $\Delta t$, the controller makes the computation indicated in equation (4). In other words, for this $k$'th interval, the controller samples the then obtaining $V$ twice, the $V$ obtaining $\Delta t$ prior, once, and the then obtaining set point $S$, once. According to the invention, $k$ is chosen so that $k\Delta t/T1$, (or as nearly one as possible, since $T/\Delta t$ is not necessarily an integer). In short, the controller makes up on the $k$'th interval for the omission of a term corresponding to $$\frac{\Delta t}{T}(S_t - V_t)$$

in the $(k-1)$ preceding computations, and for a period of control $k \gg t$, the controller will, in effect, have implemented equation (2), without, however, having had to apply the weighting factor $\Delta t/T$ within the parentheses of equation (2). In other words, for $k-1$ sampling intervals, the control action is measured out as indicated by equation (3), but on the $k$'th interval, the control action is measured out by equation (4).

The controller, so to speak, makes up on the $k$'th interval, for having provided no reset action at all on the preceding $(k-1)$ intervals.

It will be evident that implementation of the so-called proportional plus reset control law of equation (1), by means of the sampling regime described above, also requires an integration in order to provide $u_t$. In the strict sense, therefore, the controller according to the invention is incomplete unless it has an integrating stage that integrates its output $\dot{u}_t$.

Such integrating stage may or may not be distinct from the mechanism of the final process control element. The final process control element is preferably of the type such that if the controller sets it to produce a control effect $m$, it will continue to produce that same control effect even though the controller is then disconnected from the final control element. Reverting to the process example supra, the valve could be in the nature of those described in U.S. Pat. Nos. 1,170,614, 2,035,602 and 2,076,616, to Darwin et al., to Hubbard, and to Clarridge, respectively. Thus, stem 9 of the valve in the Clarridge patent does not change its height except while motor 16 runs. Hence, the position of stem 9 at the end of any interval of time $t-t_o$, is the sum of its position $m_o$ at $t_o$ and all the changes $\Delta m$ it has undergone during the period $t-t_o$, the summation being algebraic, of course, an upward change corresponding, say, to a positive change, and a downward change, then, to a negative change, and the position $m_o$ being considered positive.

This type of valve therefore is in effect an integrator, and control effect $m_t$ thereof is produced by adding $\Delta m_t$ to $m_{t-\Delta t}$ its control effect $\Delta t$ prior to time $t$. That is, to change valve position, the controller needs to produce only $\Delta u$. This is to be contrasted to valves of the type shown in U.S. Pat. No. 3,188,048 to Sutherland (assignor to the assignee of the present invention) wherein a spring 15 biases the valve to a position cutting off opening 2 from opening 4, unless controller output (fluid pressure) is actually applied to piston 14. That is, the controller must produce not only $\Delta u_t$, but also must continue to produce $u_{t-\Delta t}$ to cause the valve to create $m_t = \Delta m \neq m_{t-\Delta t}$ instead of merely $\Delta m_t$.

It will therefore be apparent that if the controller in the example described above acts in accordance with the regime prescribed in connection with equations (3) and (4), it will produce $u$ as output, and if the process control valve is of the integrating type, and its position changes in accordance with $\dot{u}$, the effect of control in accordance with equation (1) will result. Nevertheless, the valve could instead be of the Sutherland type (FIG. 2 species), in which case the controller would have to have an integrating stage to transform $\dot{u}$ to $u$.

The foregoing has not assumed any particular structural form for the controller, and it will be obvious to one skilled in the art that such controller could use analog or digital components, and that these could be of various nature; electrical, mechanical, pneumatic electromechanical, and so on.

However, the regime described in connection with equations (3) and (4) is peculiarly suited to digital realization, and in fact a general purpose digital computer is quite capable of carrying it out. Such digital computers provided with suitable input and output devices have been used heretofore for process control, but not in accordance with features of the invention set forth supra. Moreover, such digital computers as have been used for process control have been so used because one such computer can control many control loops, and/or can provide control in accordance with rather more elaborate computational regimes than necessitated by the simple proportional plus reset, single variable control action contemplated in the present case.

Such limitations as these are imposed by the relatively high cost, and even the sheer bulk of conventional digital computer control facilities. As will be evident from FIG. 2 and the description thereof now to follow, a digital form of the controller according to the invention is not subject to such limitations, because it can be sufficiently simple, compact and inexpensive as to be a practical replacement for a prior art single loop, proportional plus reset controller.

In FIG. 2, a process control system including a preferred embodiment of the invention is illustrated as a configuration of boxes and other symbols suitably labeled and representing entities capable of performing various functions known to the prior art, and whose specific structure forms no part of the present invention.

Box PR represents a process entity, say, the tank of water being heated in the heat exchange process example described hereinabove. Box CA represents the source of a control agent, say steam, as in said example. Box CE represents a control element for controlling the effect of the control agent on the process, say a valve, as in said example.

Box AD represents suitable means for measuring a process variable in the process entity PR, and for converting such measurement into binary digital form. As it is usual to exhibit the value of the process variable (say, temperature, as in said example), box AD is shown as having a pointer and scale device 1 for so doing. Ordinarily, the process variable would be indicated in decimal terms, and it is evident that the indicator could be of the type that exhibits numerical values directly rather than as positions of a pointer on a scale.

The system of FIG. 2 as thus far described is well known in the art. The remainder of the system is the controller according to the invention and, save for the optional exception of the box labeled I, in practice forms a unitary compact structure (which could also include the analog to digital conversion and indicating features of box AD).

The solid lines interconnecting boxes PR, CE and CA, and the arrowheads thereon, respectively represent the channels via which the control agent is transferred to the process, and the direction of such transfer. It is evident that the transfer could occur in the opposite direction, and/or to and/or from entities not shown and yet be controllable in the fashion of the illustrated system.

The remaining solid lines interconnecting boxes of the system represent channels for flow of information corresponding to the symbols of the several equations given hereinbefore, and the arrowheads of the last said solid lines indicate the direction of flow of information.

It will be seen that most of the last said channels are labeled in accordance with the symbols of equations (2) et al. Thus, the analog to digital converting means and measuring means represented by box AD receives continuously varying information representing the process variable $V$ and emits the information $V_t$ in the form of a digital signal that changes by integral amounts corresponding to continuous changes in the process variable $V$. The desired resolution of the analog-digital conversion is typically one part in a thousand, hence, the construction of box AD may conveniently be such as to be capable of emitting a 10-bit binary signal (i.e., $2^{10} = 1024$) for the largest expected value of $V$, and to be capable of detecting a change in $V$ equivalent to one binary bit.

Box DB represents a decimal to binary converter for producing up to a 10-bit binary signal $S_t$. While $S_t$ ordinarily is normally given by manual setting (as by turning a knob 2 of box DB until the desired number in decimal terms is indicated by an indicator 3), $S_t$ may be produced otherwise, even automatically, and may vary with time.

The binary signals $S_t$ and $V_t$ are read into registers A and C, respectively, under control of a timing control represented by a box TC. One function of box TC is to cause $V_t$ to be entered into register C at intervals $\Delta t$, to cause the $V_t$ already in register C to be entered into register B. That is to say, at the end of each interval $\Delta t$, the $V_t$ in register C becomes $V_{t1}$ t, and register B provides a means to store this $V_{t-\Delta t}$. Naturally, any $V_{t-\Delta t}$ in register B when a new $V_t$ is entered in register C is replaced by a new $V_{t-\Delta t}$ which in turn is the old $V_t$ in register C replaced by the new $V_t$ from box AD. Timing control TC provides means for setting the magnitude $\Delta_t$, for example, in the form of knob 4 which may be turned until and indicator 5 indicates that the desired $\Delta t$ is obtained. In practice, it is convenient to think in terms of $1/\Delta t$, namely, the rate of sampling process variable $V$, and indicator 5 may therefore be arranged to provide sampling rate indications.

Supposing the system to be in operation, it is evident that at any instant the registers A, B and C contain $S_t$, $V_{t-\Delta t}$ and $V_t$, respectively, in binary form. As indicated by dashed line interconnecting boxes B, C and TC, and the label "$V$-shift and entry" applied to the arrowheaded terminal portions of such dashed line, at the end of each interval $\Delta t$, timing control TC causes a new $V_t$ to be entered in register C and the old $V_t$ to be entered into register B. At that time, as indicated by the dashed line interconnection of box TC and a pair of normally closed gates 6 and 7 (illustrated like single-pole, single-throw normally open switches), timing control TC causes the new contents of registers B and C to be entered into an accumulator represented by a box AC.

The accumulator AC includes, in part, the elements of a register having a plurality of inputs by means of which binary information can be entered in the accumulator AC, and has the further property of algebraically summing the information entered therein via its inputs. Thus, the timing control TC opens gates 6 and 7, to allow the said new contents of registers B and C to be read into accumulator AC via inputs 8 and 9, respectively. Input 8 is shown as a circled plus sign indicating that information entered there is treated as a positive quantity, whereas the circled minus sign representing input 9 indicates that the accumulator AC treats information entered there as negative. The symbol $\Delta t$ applied to the arrowheaded terminal portions of the dashed line interconnecting timing control TC and gates 6 and 7 signifies that these gates are opened at intervals $\Delta t$ synchronously with the occurrence of a "$V$-shift and entry" providing new information to be entered in accumulator AC from registers B and C.

The algebraic summation action of accumulator AC as thus far described results in a quantity existing therein equal to the difference between the quantities entered therein via inputs 8 and 9 and having the sign of the larger of the said quantities.

It will be evident that the above said difference is $(-V_t+V_{t-\Delta t})$, which represents $\dot{u}_t$ of equation (2), supra. Accordingly, accumulator AC is represented as having an output 10 providing $\dot{u}_t$ and it is evident that if $\dot{u}_t$ is integrated, then the quantity $u_t$, proportional to the rate at which control element CE should allow the control agent from source CA to effect the process, will be obtained.

In FIG. 2, integration is provided for by a digital to analog converter and a control element motor or actuating mechanism represented by the boxes labeled DA and I, respectively.

Converter DA reads out the difference $(-V_t+V_{t-\Delta t})$ from accumulator AC, and produces a signal having a magnitude corresponding to that of this difference. This last said signal, in effect $\Delta m_t$, is applied to actuating mechanism I such as to cause the action of control element CE to change to $m_t = (m_{t-\Delta t} + \Delta m_t)$, whereby the effect of control agent on the process becomes a function of $(m_{t-\Delta t} + \Delta m_t)$, i.e., $f(m_t)$.

Taking the control element to be a valve and integrator I to be a reversible motor, for increasing and decreasing the extent to which the valve is open, the converter DA applies its output signal to one or the other of inputs 11 and 12 of integrator I, under the control, say, of sign information from an output 13 of accumulator AC, which, so to speak, tells the converter DA which of inputs 11 and 12 to apply its output signal to, that is, whether it is to open the valve or to close the valve. Thus, if the difference in accumulator AC is negative, meaning, say, close the valve some, converter DA will apply its output signal to input 12, whereby as a result, the extent to which the valve is open decreases by an amount proportional to $\Delta m_t$. For a positive difference, then, the output signal of converter DA will be applied to input 11, to open the valve an amount proportional to $\Delta m_t$.

At this point, it is convenient to provide for setting $G$, the proportional gain constant of equations (2) et al. Thus, a knob 14 may be provided on converter DA, to be manually set to positions indicated by an indicator 15 in terms of the values of $G$ corresponding to the knob positions. This gain setting is merely a matter of varying the numerical proportionality between the magnitude of the converter's output signal and the magnitude of the difference read out of accumulator AC by converter DA and corresponding to the last said output signal.

Since reset is to be introduced periodically, gates 16 and 17 are provided which control entry of $S_t$ and $V_t$ in accumulator AC via inputs 18 and 19 of the latter. As is suggested by the plus and minus symbolism of these inputs, the information at input 18 is treated as a positive quantity and that at input 19 is treated as a negative quantity, and such information as is presented at said inputs is algebraically summed with that presented at inputs 8 and 9. Thus, supposing all of gates 6, 7, 16 and 17 to be open, then $V_t$ is entered twice in accumulator AC, whereas $S_t$ and $V_{t1\ t}$ are entered once each, to form the difference:

$$\text{diff.} = (-V_t + V_{t-\Delta t} + S_t - V_t) \quad (5)$$

which is then transformed into $\Delta m_t$.

Opening gates 16 and 17 is under control of timing control TC as is indicated by dashed line interconnecting gates 16 and 17 and timing control TC, the label $k\Delta t$ being applied to the corresponding arrowheaded timing portion of such dashed line to indicate that these gates are open only for each $k'$th interval $\Delta t$. Conveniently, a knob 23 on timing control TC provides for setting the value of $k$, which setting is indicated by means of an indicator 20, say, in terms of $(1/\Delta t)$ multiplied by inverse powers of 2, if indicator 5 indicates in terms of $1/\Delta t$.

Accumulator AC and converter DA would be under the control of timing control TC, as suggested by dashed line interconnecting boxes AC and TC, in order to enable the digital to analog conversion, and so on. Also, as in practice it is possible that the time needed for making the change $\Delta m_t$ may be longer than can be accommodated in one sampling interval $\Delta t$, it may be desirable to stop the change in control element action at the end of the timing interval $\Delta t$ in which it began. Thus, the digital to analog conversion represented by box DA may be carried out by counting down the accumulator difference at a fixed time rate (which, of course, could be set to determine $G$). The control element may then be caused to change its action at constant rate for the duration of the countdown, which would last until the countdown reached zero (or surpassed zero by one bit) or until the next interval $\Delta t$ began. In the latter case, the uncounted down part of the difference in accumulator AC would remain there to be summed with the new process information next entering accumulator AC, timing control TC being arranged then to inhibit countdown at the beginning of the said next interval. Obviously, timing control TC could equally well be arranged to inhibit beginning of a new sampling interval $\Delta t$ until countdown was completed. Again, with other types of digital to analog conversion it may be necessary to provide for clearing accumulator AC before each new interval $\Delta t$ begins, irrespective of whether or not the last $\Delta m_t$ has been completely converted into change of control element effect.

A gate 21 provides for set point change and start-up, and, as shown, is normally closed with respect to register A and normally open with respect to register B, so that normally, when gate 6 opens, $V_{t-\Delta t}$ is entered in accumulator AC. However, provision is made for opening gate 21 with respect to register A (as illustrated in dashed line in FIG. 2), and closing it with respect to register B, so that if gates 6 and 16 be opened, both input 8 and input 18 of accumulator AC have the information $S_t$ applied thereto.

For example, a knob 22 is shown as provided on converter DB, knob 22 representing a manually-actuated device which, when operated, causes timing control TC to open gate 21 with respect to register A, and to close it with respect to register B. Preferably, this results in opening gates 6, 7, 16 and 17 as well so that as a result $V_t$ is entered twice in accumulator AC and $S_t$ is entered twice therein, thereby implementing equation (5), but with $V_{t-\Delta t}$ replaced by $S_t$.

Since the condition of each of gates 6, 7, 16 and 17 being open is also a result of a $k'$th sampling during normal operation of the controller, timing control TC preferably takes over the control of gates 6, 7, 16 and 17 after one sampling with gate 21 open with respect to register A, opens gate 21 with respect to register B and resumes operation in accordance with equations (3) and (4).

Thus, as indicated by dashed line interconnecting boxes TC and DB, and sharing the label "S-change/Start-up" with gate 21, operation of knob 22 would cause timing control TC to open gate 21 with respect to register A, and to act as if a $k'$th sampling interval were thus begun. Hence, by the end of start-up interval $\Delta t$, timing control TC would have restored all gates to the condition illustrated, and would, at the next sampling of $V$, open gates in accordance with equation (2) and proceed with control as usual.

On start-up, normally register C would be empty to begin with, hence implementing equation (5) would preferably cause a $V_t$ to be entered into register C along with opening gate 21 with respect to register A, whereby controller operation for start-up would be identical to that for set point change.

Integrating valves are generally of the type wherein either the actuating mechanism of the valve operates to change the valve opening continuously or the motor is pulsed to change valve opening in steps. In the former case, converter A would be arranged to produce a time output, either a pulse lasting for a time interval proportional in duration to $\dot{u}_t$ or a pair of pulses separated by a time interval proportional to $\dot{u}_t$, and the valve mechanism would be driven to change valve opening at a constant rate for such time interval. If the valve were of the other type, then converter DA would not be a digital to analog converter but rather a device for producing a time-series of pulses, in number proportional to $\dot{u}_t$, (and such proportion being a factor determining the proportionality constant $G$, of course), each pulse opening (or closing) the valve the same fixed amount.

The means represented by boxes DA, I and CE may vary widely. In the present example, boxes I and CE represent what is in practice a unitary physical structure, namely, a valve of the integrating type. However, heretofore it has been proposed to make such structure include the equivalent also of the box DA. On the other hand, integrator I need not be the actuating mechanism for the control element. Thus, reverting to the valve example again, control element CE could be a valve of the type exemplified by the above-cited Sutherland patent, in which case box I would represent a device producing a fluid pressure for positioning such valve, said device operating to produce a pressure output changing by amounts proportional to $\Delta m_t$ from some initial value of pressure.

The scheme illustrated in FIG. 2, will suffice to inform those skilled in the art how to construct and practice the present invention. The actual construction of the entities represented by the boxes and other symbols may be of routine sort. For example, registers A, B and C are ordinary shift registers.

The digital information utilized in the controller is preferably in parallel form, but the summation in accumulator AC may take place serially after the manner in which equations (3) et al. are written. Again, the difference in accumulator AC could be read out and converted to analog form by counting it down, a serial process.

It will be evident from the foregoing that the combination of registers A, B and C, accumulator AC and timing control TC is a rudimentary sort of digital computer in which the registers provide information storage, accumulator AC provides the arithmetical operations, and timing control provides the program for the computer. Like its more elaborate counterparts in process control service, the controller according to the present invention manipulates process data in binary form ($V$ and $S$) to produce control data in binary form (the difference computed by accumulator AC) which necessitates translation by some means (digital to analog converter DA and integrator I) to a form usable by a conventional control device (control element CE). The controller as computer, indeed, is mainly unlike its prior art counterpart in that it has but the one basic program implied by equations (3) et al. This program, which is new, and drastically simplifies digitally implementing control in the style of equation (1), nevertheless could be performed in a process control system by a conventional digital computer. As is well understood in the art, where large numbers of control loops are involved, control by a single conventional digital computer can be economically feasible, and such practice is within the spirit of the invention, if the manner of introducing reset be according to the present invention.

While the cooperation represented by the timing control TC and the dashed line symbolism is peculiar to the controller according to the present invention, one skilled in the digital computing arts would be able to devise numerous schemes for implementing the said cooperation. Since this cooperation is within the programming capabilities of conventional general purpose computers, it is evident that program hardware, such as is used in the latter, provide the necessary teachings for constructing a suitable timing control TC.

It is also evident that a digital arrangement, such as is indicated in FIG. 2, is not the only possible means of implementing equations (3) et al. For example, it is evident that proportional action could be implemented on an analog basis, i.e., continuously applied, whereas reset could be applied on the sampling basis indicated in connection with equations (2) and (3), supra.

Since the logic, arithmetic, control, program and memory functions involved in the digital system shown in FIG. 2 can be performed by corresponding instrumentalities well known in the digital computer art, those skilled in that art will easily be able to practice the invention claimed herein from the present disclosure of the basis steps, and their sequence, in the operation of a control system using the controller according to the invention.

In one example of the invention, the controller was constructed on a printed circuit card, resistance capacitance coupled transistor logic basis. In this form, the controller was slightly smaller than a typical analog counterpart. The integrator I and the control element CE were provided separately in the form of a commercially-available valve operated by a constant speed reversible electric motor and capable of changing between full close and full open in about 10 seconds. Converter AD was also separate and of commercially-available construction.

Readout of the accumulator AC was provided by countdown, the rate of which could be varied from 16.5 to 295 bits per second. Sampling time $\Delta t$ could be adjusted through the range of 7 to 130 seconds, and $k$ could be set at values of 1, 2, 4, 8 and 16. The controller of these specifications was found suitable for controlling single and multiple capacity processes having time constants from 2 to 1,800 seconds.

The specified ranges of adjustment provided the controller with a capability for adjustment to differing process needs like that of a conventional proportional plus reset analog controller. It is to be noted, however, that the analog controller generally provides for but two adjustments for setting proportional gain and reset time, whereas the controller according to the invention has three adjustments for making what amounts to those two settings. The latter controller is therefore more flexible in its adjustment capabilities, for example, it is sometimes found that the controller has more than one set of values of $k, \Delta t$, and $G$ with which it can control the process properly in accordance with a given standard.

Performance of the controller with the above specifications was equivalent to that of such analog counterparts as those disclosed in U.S. Pat. Nos. 2,638,919 and 3,127,105, to Clarridge and to Nichols, respectively (both assignors to the assignee of the present invention), when applied to processes of the sort requiring proportional plus reset action. In particular, the controller of the present invention is inherently free of "reset windup." As is indicated by Nichols and by Clarridge, rate action is sometimes combined with proportional plus reset action, and it would not be beyond the scope of the present invention to do so in the present case.

In view of the foregoing description, those skilled in the art will be able to realize the present invention in numerous forms, the essentials of which will be within the scope of the claims appended hereto and the uses of which will be those now known or contemplated in the art of process control.

I claim:

1. A controller constructed and arranged to periodically sample the magnitude of an error signal and the magnitude of change in said error signal; said controller including sampling rate adjusting means operable to adjust the rate at which one said magnitude is sampled, with respect to the rate at which the other said magnitude is sampled; said controller including integrating means operable to integrate the magnitudes thus sampled and to produce control effect at a rate corresponding to integrals of the magnitudes if integrates.

2. The controller of claim 1, wherein the first said rate is rate of sampling the first said magnitude and said rate adjusting means provides for adjusting said first said rate to values less than the rate of sampling the other said magnitude.

3. The controller of claim 1, wherein said controller includes set point means settable to provide various magnitudes of set point signal independent of magnitudes of said error signal; said controller being constructed and arranged to provide said error signal by sampling the magnitude of the difference between the magnitude of said set point signal and the magnitude of a process variable signal; said controller including means responsive to said set point means being set to provide said set point signal with magnitude different from the first said magnitude thereof, to cause said controller to thereupon sample the magnitude of the difference between the second said set point signal and said process variable signal.

4. The controller of claim 1, wherein said controller includes set point means settable to provide various magnitudes of set point signal; said controller being constructed and arranged to provide said error signal by sampling the magnitude of the difference between one magnitude of said set point signal and the magnitude of a process variable signal; said controller including means responsive to setting said set point means to provide another, different magnitude of said set point signal, to cause the next magnitude sampled by said controller to be the magnitude of the difference between the last said set point signal and said process variable signal, and to cause said next magnitude to be sampled twice, irrespective of the sampling rates set by said sampling rate adjusting means; said means operative upon setting said set point means also being operative to cause said controller to resume sampling at said sampling rates after said next magnitude has been sampled twice.

5. The controller of claim 1, wherein said controller is constructed and arranged such that the first said rate of sampling is a fraction of the other rate of sampling, and such that each sampling at said first said rate accompanies a sampling at said other rate; said controller including set point means settable to provide various magnitudes of set point signal; said controller being constructed and arranged to provide said error signal by sampling the magnitude of the difference between one magnitude of said set point signal and the magnitude of a process variable signal; said controller including means responsive upon setting said set point means to provide another and different magnitude of said set point signal, to cause the next magnitude sampled by said controller to be the two magnitudes of the difference between the last said set point signal and said process variable signal.

6. A proportional plus reset controller, comprising a first register containing the present value of a process variable; a second register containing the past value of said process variable; a third register containing the desired value of said process variable; an accumulator arranged to receive said present value as a negative quantity, said past value as a positive quantity, and said desired value as a positive quantity, and said accumulator being responsive to such quantities to produce a signal representing the algebraic sum of said quantities; integrating means responsive to said signal to change a control effect in a sense and amount corresponding to said sum; and timing control means being operative at intervals $\Delta t$ to cause said past value to be replaced by said present value, said present value to be replaced by the then present value of said process variable, and substantially simultaneously allowing said accumulator to receive the replacing values in said first and second registers; said control means also being operative to allow said accumulator to receive said desired value at intervals of $k\Delta t$ only, where $k$ is a positive integer.

7. The invention of claim 6, wherein said integrating means is provided by control effect producing means of the type wherein the rate at which said control producing means produces its control effect is at any instant the algebraic summation of all past changes in said rate.

8. The invention of claim 6, wherein set point means is provided for replacing the said desired value by a new desired value, said timing control means being responsive upon such replacement to also replace the said past value in said second register with said new desired value and at the same time to allow said accumulator to receive the replacing values in all three said registers as if replacement of desired value had occurred on a $k'$th interval $\Delta t$.

9. In a controller constructed and arranged to produce a proportioning plus reset process control effect in a process controlled by said controller, wherein the proportioning part of said effect is a function of the time variation of a process variable in said process, and wherein the reset part of said effect is a function of the deviation of said process variable from a desired value thereof, the improvement comprising means responsive to change of desired value of said process variable to a new desired value thereof such as to make said proportioning part of said effect a function of the deviation of said process variable from said new desired value; and said controller being of the type wherein said proportioning part and said reset part are produced together at predetermined times, whereas at other times said proportioning part only is produced; the last said means being responsive to said change in desired value to cause said reset part to be produced, irrespective of whether or not said change in desired value occurs at the one of said predetermined times.

10. In a process control system including a controller having computing means for producing process control action effectively in accordance with a proportional plus reset control law having the form $G(e_t + \frac{1}{T} \int e_t dt)$, said computing means including first means of computing a first quantity representative of $e_t$, second means for computing a second quantity representative of $\int e_t dt$, third means for accumulating said first quantity and said second quantity, fourth means for multiplying said third means' accumulation of quantity by a quantity representative of $G$, said computing means including timing means so constructed and arranged that said second means computes said second quantity only upon a lapse of time corresponding to $T$; and that said first means computes said first quantity substantially through said lapse of time, from beginning to end thereof.

11. The invention of claim 10, wherein said first quantity corresponds to the t derivative $e_t$, said second quantity corresponds to the time derivative of $\int e_t dt$, and fifth means is provided responsive to said fourth means for integrating said accumulation.

12. The invention of claim 11, wherein said first means computes $(e_{t-\Delta t} - e_t)$, and said second means computes $e_t$, said timing means making said first means operative to compute at intervals $\Delta t$, said second means operative to compute at intervals $k\Delta t$, wherein $k$ is a positive integer representative of $T/\Delta t$.

13. In a process control system including a controller having computing means for producing process control action effectively in accordance with $$u_t = \frac{G}{\Delta t}\left[ -V_t + V_{t-\Delta t} + \frac{\Delta t}{T}(S_t - V_t) \right]$$

said computing means including timing control means causing said computing means to compute the quantity $$\frac{G}{\Delta t}(-V_t + V_{t-\Delta t})$$

only, and at intervals $\Delta t$, said timing control means being operative to cause said computing means to also compute the quantity $$\frac{G}{\Delta t}(S_t - V_t)$$

but only at intervals $k\Delta t = T$; said computing means including accumulator means accumulating said quantities; there also being provided integrating means for integrating the accumulations of said accumulator means.

14. The invention of claim 13, including control effect producing means responsive at intervals $\Delta t$ to said accumulations to change its said control effect in proportion to said accumulations, whereby said integrating means is provided by said control effect producing means.